US 010891973B2

(12) United States Patent
Contreras et al.

(10) Patent No.: US 10,891,973 B2
(45) Date of Patent: Jan. 12, 2021

(54) HIGH-BANDWIDTH STO BIAS ARCHITECTURE WITH INTEGRATED SLIDER VOLTAGE POTENTIAL CONTROL

(71) Applicant: Western Digital Technologies, Inc., San Jose, CA (US)

(72) Inventors: John Contreras, Palo Alto, CA (US); Yunfei Ding, Fremont, CA (US); Kuok San Ho, Redwood City, CA (US); Ian Robson McFadyen, San Jose, CA (US); Joey Martin Poss, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/816,211

(22) Filed: Mar. 11, 2020

(65) Prior Publication Data

US 2020/0211584 A1    Jul. 2, 2020

Related U.S. Application Data

(63) Continuation of application No. 16/537,594, filed on Aug. 11, 2019, now Pat. No. 10,629,229, which is a continuation of application No. 15/918,060, filed on Mar. 12, 2018, now Pat. No. 10,424,323, which is a
(Continued)

(51) Int. Cl.
   *G11B 5/02*       (2006.01)
   *G11B 5/09*       (2006.01)
(52) U.S. Cl.
   CPC ..................... *G11B 5/02* (2013.01)
(58) Field of Classification Search
   CPC ........... G11B 5/3903; G11B 5/40; G11B 4/54;
   G11B 5/4907; G11B 5/332; G11B 2005/0021; G11B 2005/0005; G11B 5/314; G11B 5/09; G11B 2220/90; G11B 5/035;
(Continued)

(56) References Cited

U.S. PATENT DOCUMENTS 6,201,653 B1    3/2001    Contreras et al.
6,614,554 B1    9/2003    Yokoi
6,813,115 B2    11/2004   Van der Heijden et al.
(Continued)

FOREIGN PATENT DOCUMENTS

CN    104835510 B    11/2017
JP    2013047999 A    3/2013
(Continued)

OTHER PUBLICATIONS

Center for Memory and Recording Research, "Research Review & Advisory Council Meeting Program," Oct. 8-9, 2015.
(Continued)

*Primary Examiner* — Nabil Z Hindi
(74) *Attorney, Agent, or Firm* — Jacobsen IP Law

(57) ABSTRACT

Disclosed herein are circuits, architectures, and methods that provide for the control of a data storage device write head's trailing shield and main pole potential with respect to the disk using circuitry that is integrated with circuitry used to bias a spin torque oscillator (STO) apparatus. Various embodiments include slider connections with STO bias circuitry that resides in a read/write integrated circuit, which has a programmable circuit that generates a bias current with overshoot (bias kicks). Also disclosed are circuits that may be incorporated into a slider to mitigate radio-frequency interference.

20 Claims, 8 Drawing Sheets

Related U.S. Application Data continuation of application No. 15/395,157, filed on Dec. 30, 2016, now abandoned.

(58) Field of Classification Search
CPC ........... G11B 5/02; G11B 19/20; G11B 19/28; G11B 5/54
USPC ...... 360/75, 313, 59, 33, 43, 46, 65, 67, 68, 360/73.01, 323, 328, 123.26
See application file for complete search history.

(56) References Cited

U.S. PATENT DOCUMENTS

| | | |
|---|---|---|
| 7,310,197 B2 | 12/2007 | Baumgart et al. |
| 7,397,633 B2 | 7/2008 | Xue et al. |
| 7,538,977 B2 | 5/2009 | Gider et al. |
| 7,724,469 B2 | 5/2010 | Gao et al. |
| 7,869,160 B1 | 1/2011 | Pan et al. |
| 7,982,996 B2 | 7/2011 | Smith et al. |
| 8,049,984 B2 | 11/2011 | Contreras et al. |
| 8,116,031 B2 | 2/2012 | Alex et al. |
| 8,174,798 B2 | 5/2012 | Nagasawa et al. |
| 8,179,633 B2 | 5/2012 | Contreras et al. |
| 8,203,192 B2 | 6/2012 | Gao et al. |
| 8,208,219 B2 | 6/2012 | Zhang et al. |
| 8,238,059 B1 | 8/2012 | Tang et al. |
| 8,274,811 B2 | 9/2012 | Zhang et al. |
| 8,339,736 B2 | 12/2012 | Gao et al. |
| 8,351,155 B2 | 1/2013 | Contreras et al. |
| 8,400,734 B2 | 3/2013 | Yamada et al. |
| 8,422,159 B2 | 4/2013 | Gao et al. |
| 8,446,690 B2 | 5/2013 | Alex et al. |
| 8,467,149 B2 | 6/2013 | Takeo et al. |
| 8,472,135 B1 | 6/2013 | Kusukawa et al. |
| 8,472,140 B2 | 6/2013 | Yamada et al. |
| 8,537,497 B2 | 9/2013 | Nagasaka et al. |
| 8,553,346 B2 | 10/2013 | Braganca et al. |
| 8,564,903 B2 | 10/2013 | Min et al. |
| 8,570,684 B1 | 10/2013 | Contreras et al. |
| 8,582,240 B1 | 11/2013 | Chen et al. |
| 8,599,506 B2 | 12/2013 | Contreras et al. |
| 8,654,465 B2 | 2/2014 | Braganca et al. |
| 8,755,153 B2 | 6/2014 | Kudo et al. |
| 8,797,693 B1 | 8/2014 | Furukawa et al. |
| 8,824,104 B1 | 9/2014 | Koui et al. |
| 8,879,205 B2 | 11/2014 | Shiimoto et al. |
| 8,896,973 B2 | 11/2014 | Nagasawa et al. |
| 8,917,465 B1 | 12/2014 | Contreras et al. |
| 8,953,273 B1 | 2/2015 | Funayama |
| 9,001,444 B1 | 4/2015 | Contreras et al. |
| 9,007,722 B2 | 4/2015 | Shimizu et al. |
| 9,007,723 B1 | 4/2015 | Igarashi et al. |
| 9,042,051 B2 | 5/2015 | Zeng et al. |
| 9,047,888 B2 | 6/2015 | Katada et al. |
| 9,064,508 B1 | 6/2015 | Shiimoto et al. |
| 9,099,128 B1 | 8/2015 | Contreras et al. |
| 9,142,227 B1 | 9/2015 | Etoh et al. |
| 9,202,528 B2 | 12/2015 | Furukawa et al. |
| 9,230,569 B1 | 1/2016 | Shimoto et al. |
| 9,230,571 B1 | 1/2016 | Chen et al. |
| 9,275,672 B2 | 3/2016 | Shiroishi et al. |
| 9,318,131 B2 | 4/2016 | Tian et al. |
| 9,330,691 B1 | 5/2016 | Narita et al. |
| 9,355,657 B1 | 5/2016 | Aoyama et al. |
| 9,355,668 B2 | 5/2016 | Nishida et al. |
| 9,368,135 B2 | 6/2016 | Gao |
| 9,378,759 B2 | 6/2016 | Nagasaka et al. |
| 9,390,734 B2 | 7/2016 | Gao |
| 9,679,587 B2 | 6/2017 | Taguchi |
| 9,881,637 B1 | 1/2018 | Wilson et al. |
| 10,121,497 B1 | 11/2018 | Takahashi et al. |
| 10,135,392 B2 | 11/2018 | Wei et al. |
| 10,186,284 B2 | 1/2019 | Narita et al. |
| 10,236,021 B2 | 3/2019 | Narita et al. |
| 10,276,193 B2 | 4/2019 | Narita et al. |
| 2002/0130658 A1 | 9/2002 | Abe |
| 2006/0067006 A1 | 3/2006 | Takagishi et al. |
| 2007/0195453 A1 | 8/2007 | Kameda et al. |
| 2008/0212239 A1 | 9/2008 | Kawato et al. |
| 2008/0304176 A1 | 12/2008 | Takagishi et al. |
| 2009/0059423 A1 | 3/2009 | Yamada et al. |
| 2009/0080106 A1 | 3/2009 | Shimizu et al. |
| 2009/0310244 A1 | 12/2009 | Shimazawa et al. |
| 2010/0091623 A1 | 4/2010 | Tsuyama |
| 2011/0134561 A1 | 6/2011 | Smith et al. |
| 2011/0216435 A1 | 9/2011 | Shiimoto et al. |
| 2011/0279921 A1 | 11/2011 | Zhang et al. |
| 2011/0310510 A1 | 12/2011 | Anagawa et al. |
| 2012/0002331 A1 | 1/2012 | Oikawa et al. |
| 2012/0113542 A1 | 5/2012 | Igarashi et al. |
| 2012/0224283 A1 | 9/2012 | Sato et al. |
| 2012/0243127 A1 | 9/2012 | Iwasaki et al. |
| 2012/0275061 A1 | 11/2012 | Takagishi et al. |
| 2013/0235485 A1 | 9/2013 | Livshitz et al. |
| 2013/0250456 A1 | 9/2013 | Yamada et al. |
| 2013/0258514 A1 | 10/2013 | Kobayashi et al. |
| 2014/0063648 A1 | 3/2014 | Shiroishi et al. |
| 2014/0104724 A1 | 4/2014 | Shiroishi et al. |
| 2014/0139952 A1 | 5/2014 | Takeo et al. |
| 2014/0146420 A1 | 5/2014 | Shimizu et al. |
| 2014/0168824 A1 | 6/2014 | Ju et al. |
| 2014/0177092 A1 | 6/2014 | Katada et al. |
| 2014/0177100 A1 | 6/2014 | Sugiyama et al. |
| 2014/0268428 A1 | 9/2014 | Dimitrov et al. |
| 2014/0269235 A1 | 9/2014 | Gong et al. |
| 2015/0002963 A1 | 1/2015 | Tian et al. |
| 2015/0092292 A1 | 4/2015 | Furukawa et al. |
| 2016/0027455 A1 | 1/2016 | Kudo et al. |
| 2016/0027456 A1 | 1/2016 | Gao |
| 2016/0035373 A1 | 2/2016 | Takagishi et al. |
| 2016/0035375 A1 | 2/2016 | Gao |
| 2016/0055866 A1 | 2/2016 | Le et al. |
| 2016/0180906 A1 | 6/2016 | Kudo et al. |
| 2017/0236537 A1 | 8/2017 | Murakami et al. |
| 2018/0252780 A1 | 9/2018 | Iwasaki et al. |
| 2018/0261241 A1 | 9/2018 | Narita et al. |
| 2018/0268848 A1 | 9/2018 | Narita et al. |
| 2019/0088274 A1 | 3/2019 | Narita et al. |
| 2019/0088275 A1 | 3/2019 | Narita et al. |

FOREIGN PATENT DOCUMENTS

| | | |
|---|---|---|
| JP | 2013251042 A | 12/2013 |
| JP | 2014130672 A | 7/2014 |
| JP | 2015011745 A | 1/2015 |
| JP | 2014081981 B | 2/2017 |
| JP | 2018146314 A | 9/2018 |
| JP | 2018147540 A | 9/2018 |
| JP | 2018158709 A | 10/2018 |
| WO | 2015126326 A1 | 8/2015 |

OTHER PUBLICATIONS

Mike Mallary, et al., "Head and Media Challenges for 3 Tb/in2 Microwave-Assisted Magnetic Recording," IEEE Transactions on Magnetics, vol. 5, Iss. 7, Jul. 2014.

Takuto Katayama, et al., "Micromagnetic model analysis of integrated single-pole-type head with tilted spin-torque oscillator for high-frequency microwave-assisted magnetic recording," J. Appl. Phys. 117, 17C503 (2015).

Yasushi Kanai, et al., "Micromagnetic Simulation of Spin-Torque Oscillator for Microwave-Assisted Magnetic Recording—Interaction Between Write Head and STO and Optimum Injected Current," IEEE Transactions on Magnetics, vol. 52, Issue 7, Jul. 2016.

HIGH-BANDWIDTH STO BIAS ARCHITECTURE WITH INTEGRATED SLIDER VOLTAGE POTENTIAL CONTROL

CROSS-REFERENCE TO RELATED APPLICATIONS

This application is a continuation of, and hereby incorporates by reference the entirety of, U.S. application Ser. No. 16/537,594, filed on Aug. 11, 2019 and entitled "HIGH-BANDWIDTH STO BIAS ARCHITECTURE WITH INTEGRATED SLIDER VOLTAGE POTENTIAL CONTROL," which is a continuation of U.S. application Ser. No. 15/918,060, filed on Mar. 12, 2018 and entitled "HIGH-BANDWIDTH STO BIAS ARCHITECTURE WITH INTEGRATED SLIDER VOLTAGE POTENTIAL CONTROL," which is a continuation of U.S. application Ser. No. 15/395,157, filed on Dec. 30, 2016 and entitled "HIGH-BANDWIDTH STO BIAS ARCHITECTURE WITH INTEGRATED SLIDER VOLTAGE POTENTIAL CONTROL." As did U.S. application Ser. Nos. 16/537,594, 15/918,060 and 15/395,157, this application also hereby incorporates by reference the entirety of U.S. nonprovisional application Ser. No. 15/395,111, filed Dec. 30, 2016 and entitled "APPARATUS AND METHOD FOR WRITING TO MAGNETIC MEDIA USING AN AC BIAS CURRENT TO ENHANCE THE WRITE FIELD."

BACKGROUND

Magnetic storage systems, including data storage devices such as hard disk drives, are used to store large amounts of information. A magnetic head in a magnetic storage system typically includes read and write transducers for retrieving and storing magnetically encoded information on a magnetic recording medium, such as a disk.

In a disk-drive system, the read and write transducers reside in a slider that flies over the recording media (e.g., a disk). As storage densities have increased, and slider fly-heights have decreased, the fly-height of the slider-to-disk spacing has become smaller. Lubricant pickup, corrosion, electrical breakdown, electrostatic discharge (ESD) can all negatively affect the fly-height of the slider. The negative effects can be mitigated or eliminated by controlling the slider's voltage potential with respect to the disk's potential. Controlling the slider's voltage reduces slider wear and allows for lower flying-heights.

Data storage devices, such as hard disk drives, can suffer from radio-frequency interference (RFI). The slider body can transfer these RFI signals to the read transducer, which could damage the read transducer or interfere with read data signals.

The need to increase storage densities has led to the development of technologies such as microwave-assisted magnetic recording (MAMR). In MAMR systems, a spin-torque oscillator (STO) comprising a field-generation layer (FGL) and spin-polarization layer (SPL) is placed within in the write gap, and a bias current is supplied to the STO. In operation, the write head generates a write field that, beneath the main pole, is substantially perpendicular to the magnetic recording layer, and the STO generates a high-frequency auxiliary field to the recording layer. Ideally, the auxiliary field has a frequency close to the resonance frequency of the magnetic grains in the recording layer to facilitate the switching of the magnetization of the grains. As a consequence, the oscillating field of the STO's FGL resonates with the media and provides strong writing. In addition, the STO's auxiliary field may also be used for write field enhancement with the STO mounted near the write head's pole tip.

To generate the auxiliary write field, the STO requires the application of a bias voltage that affects the write transducer's pole potential. In prior-art systems, this bias voltage is DC. Furthermore, the bias voltage is currently not utilized for controlling the slider's potential with respect to the disk's potential. Previous proposals for controlling the potential of the slider used a dedicated line or shared lines such as a contact sensor, which has limited functionality through a common-mode control. There is an ongoing need for methods and apparatuses that control the slider's voltage potential with respect to the disk's potential while supplying a bias current to a STO in the write gap.

SUMMARY

This summary represents non-limiting embodiments of the disclosure.

Disclosed herein are apparatuses and methods for providing a bias current to a spin-torque oscillator (STO), and read/write heads and data storage devices embodying such apparatuses and methods. Some embodiments provide for supplying the bias current to the STO while simultaneously controlling the slider's potential with respect to the potential of the magnetic medium. Some embodiments provide for shunting RFI signals on the slider to ground to mitigate the tendency of these signals to cause read errors. Some embodiments provide for electrically biasing a STO by providing an AC component (a bias kick) in addition to a low-frequency (e.g., DC) component.

In some embodiments, a circuit for electrically biasing a STO comprises a first operational transconductance amplifier (OTA), a first low-pass filter coupled to an output of the first OTA and to a first input of the first OTA, and a differential current source for providing a STO bias kick current to the STO, the differential current source having first and second outputs, wherein a second input of the first OTA is coupled to a STO bias voltage source, the output of the first OTA is coupled to a first node of the STO, the first output of the differential current source is coupled to the first node of the STO, and the second output of the differential current source is coupled to a second node of the STO. In some embodiments, the bias current comprises a low-frequency component and a kick current. In some embodiments in which the bias current comprises a low-frequency component and a kick current, one or both of the low-frequency component and the kick current is programmable. In some embodiments, a voltage provided by the STO bias voltage source is based on a programmed value of the low-frequency component and a resistance of the STO.

In some embodiments, the circuit further comprises an interface voltage control circuit coupled to the STO bias voltage source, wherein a first node of the interface voltage control source is coupled to ground and a second node of the interface voltage control source is coupled to the first node of the STO bias voltage source. In some embodiments, the circuit further comprises a first capacitor and a first termination resistance connected in series and disposed between and coupled to the second input of the first OTA and the first node of the STO. In some embodiments, the circuit further comprises a second capacitor and a second termination resistance connected in series and disposed between and coupled to a second node of the STO bias voltage source.

In some embodiments, the circuit further comprises a first analog circuit configured to determine a resistance of the STO based on the STO bias voltage and a measured STO bias current. In some embodiments including a first analog circuit, the circuit further comprises a second analog circuit configured to determine an amplitude of the STO bias kick current based on a voltage provided by the STO bias voltage source, a STO voltage kick target value, the resistance of the STO, and a termination resistance. In other embodiments including a first analog circuit, the circuit further comprises firmware configured to determine an amplitude of the STO bias kick current based on a voltage provided by the STO bias voltage source, a STO voltage kick target value, the resistance of the STO, and a termination resistance.

In some embodiments, the circuit further comprises a second OTA, and a second low-pass filter coupled to an output of the second OTA and to a first input of the second OTA, wherein a second input of the second OTA is coupled to the STO bias voltage source, the output of the second OTA is coupled to the second node of the STO, and the STO bias voltage source is programmable. In some embodiments comprising a second OTA, the circuit further comprises a capacitor and a termination resistance connected in series and disposed between and coupled to the second input of the second OTA and the second node of the STO.

In some embodiments comprising a second OTA, the circuit further comprises a first analog circuit configured to determine a resistance of the STO based on the STO bias voltage source and a measured STO bias current. In some embodiments comprising a second OTA and a first analog circuit, the circuit further comprises a second analog circuit configured to determine an amplitude of the STO bias kick current based on a voltage provided by the STO bias voltage source, a STO voltage kick value, the resistance of the STO, and a termination resistance. In other embodiments comprising a second OTA and a first analog circuit, the circuit further comprises firmware configured to determine the STO bias kick current based on a voltage provided by the STO bias voltage source, a STO voltage kick value, a resistance of the STO, and a termination resistance.

In some embodiments, a method of electrically biasing a STO comprises determining, using a first analog circuit, a resistance of the STO based on a STO bias voltage and a measured STO bias current; determining a STO bias kick current value based on (a) the resistance of the STO, (b) a termination resistance, and (c) either the STO bias voltage or a STO voltage kick value; generating the bias current based at least in part on the STO bias current kick value; and providing the bias current to the STO. In some embodiments, providing the bias current to the STO comprises supplying the bias current through a push-pull differential circuit. In some embodiments, determining the STO bias kick current value based on (a) the resistance of the STO, (b) the termination resistance, and (c) either the STO bias voltage or the STO voltage kick value comprises providing the resistance of the STO, the termination resistance, and either the STO bias voltage or the STO voltage kick value to a second analog circuit. In some embodiments, determining the STO bias kick current value based on (a) the resistance of the STO, (b) the termination resistance, and (c) either the STO bias voltage or the STO voltage kick value comprises providing the resistance of the STO and the STO voltage kick value to firmware, and, using the firmware, calculating the STO bias current kick value. In some embodiments, the bias current comprises a current kick, and generating the bias current based at least in part on the STO bias current kick value comprises determining a timing of the current kick based on (i) a positive write signal transition, (ii) a negative write signal transition, or (iii) both the positive and negative write signal transitions. In some embodiments, the bias current comprises a current kick, and the method further comprises programming a timing of the current kick.

In some embodiments, an apparatus for electrically biasing a STO comprises means for determining, using a first analog circuit, a resistance of the STO based on a STO bias voltage and a measured STO bias current; means for determining a STO bias kick current value based on (a) the resistance of the STO, (b) a termination resistance, and (c) either the STO bias voltage or a STO voltage kick value; means for generating the bias current based at least in part on the STO bias current kick value; and means for providing the bias current to the STO. In some embodiments, the apparatus further comprises means for programming a timing of the current kick.

In some embodiments, a method for electrically biasing a STO of a write element of a magnetic write head in a data storage device comprises determining an amplitude of a high-frequency component of a bias current, determining an amplitude of a low-frequency component of the bias current, generating the high-frequency component based at least in part on the determined amplitude of the high-frequency component, generating the low-frequency component based at least in part on the determined amplitude of the low-frequency component, and providing the high-frequency and low-frequency components to the STO.

In some embodiments, providing the low-frequency component to the STO comprises generating the low-frequency component using a voltage source. In other embodiments, providing the low-frequency component to the STO comprises generating the low-frequency component using a current source. In some embodiments, providing the high-frequency component to the STO comprises generating the high-frequency component using a current source. In some embodiments, the low-frequency component comprises a DC component.

In some embodiments, generating the high-frequency component is further based at least in part on a signal trigger, wherein the signal trigger is determined based on at least one write signal transition. In some embodiments, determining the amplitude of the high-frequency component comprises using firmware to calculate the amplitude of the high-frequency component based at least in part on a STO resistance value. In some embodiments, determining the amplitude of the high-frequency component comprises using a circuit to determine the amplitude of the high-frequency component.

In some embodiments, the method further comprises determining a duration of the high-frequency component. In some such embodiments, determining the duration of the high-frequency component comprises using firmware to determine the duration of the high-frequency component.

In some embodiments, generating the low-frequency component is further based at least in part on an indication that the data storage device is in a specified mode. In some such embodiments, the specified mode is a write mode. In other such embodiments, the specified mode includes at least one operation other than writing.

In some embodiments, determining the amplitude of the low-frequency component comprises using firmware to calculate the amplitude of the low-frequency component based at least in part on a STO resistance value. In some embodiments, determining the amplitude of the low-frequency component comprises using a circuit to calculate the amplitude of the low-frequency component.

In some embodiments, the method further comprises jointly optimizing a write current for writing to a magnetic medium and at least one of the low-frequency component or the high-frequency component. In some embodiments, the method further comprises programming at least one characteristic of the high-frequency component before providing the high-frequency component to the STO. In some such embodiments, the at least one characteristic comprises a delay, an advance, a timing, the amplitude, or a duration of the high-frequency component.

In some embodiments, an apparatus for electrically biasing a STO, the bias current comprising a high-frequency component and a low-frequency component, comprises means for determining an amplitude of the high-frequency component, means for determining an amplitude of the low-frequency component, means for generating the high-frequency component based at least in part on the determined amplitude of the high-frequency component, means for generating the low-frequency component based at least in part on the determined amplitude of the low-frequency component, and means for providing the high-frequency and low-frequency components to the STO. In some embodiments, the apparatus further comprises means for programming a delay or an advance of the high-frequency component before providing the high-frequency component to the STO. In some embodiments, the apparatus further comprises means for jointly optimizing a write current for writing to a magnetic medium and at least one of the low-frequency component or the high-frequency component. In some embodiments, generating the high-frequency component is further based at least in part on a signal trigger, wherein the signal trigger is determined based on at least one write signal transition. In some embodiments, the means for determining the amplitude of the high-frequency component comprise firmware configured to calculate the amplitude of the high-frequency component based at least in part on a STO resistance value. In some embodiments, the means for determining the amplitude of the high-frequency component comprise a circuit.

In some embodiments, the apparatus further comprises means for determining a duration of the high-frequency component. In some such embodiments, the means for determining the duration of the high-frequency component comprise firmware.

In some embodiments, generating the low-frequency component is further based at least in part on an indication that the data storage device is in a specified mode. In some embodiments, the specified mode is a write mode. In some embodiments, the specified mode includes at least one operation other than writing.

In some embodiments, the means for determining the amplitude of the low-frequency component comprise firmware configured to calculate the amplitude of the low-frequency component based at least in part on a STO resistance value. In some embodiments, the means for determining the amplitude of the low-frequency component comprise a circuit.

In some embodiments, the apparatus further comprises means for jointly optimizing (a) a write current for writing to a magnetic medium and (b) at least one of the low-frequency component or the high-frequency component.

In some embodiments, the apparatus further comprises means for programming at least one characteristic of the high-frequency component before providing the high-frequency component to the STO. In some such embodiments, the at least one characteristic comprises a delay, an advance, a timing, the amplitude, or a duration of the high-frequency component.

In some embodiments, a circuit to control potential of a slider body in a data storage device comprises a first resistance disposed between and coupled to the slider body and a first node of a STO of a magnetic write element, a second resistance disposed between and coupled to the first node of the STO and a second node of the STO, and a shunt circuit coupled to and disposed between the slider body and a system ground potential. In some embodiments, the shunt circuit comprises a first branch comprising a third resistance, and a second branch comprising a capacitance, wherein the first and second branches are connected in parallel. The third resistance may be approximately 750 kOhms, and the capacitance is preferably greater than or equal to approximately 40 pF.

In some embodiments, the first node of the STO is a trailing shield of the magnetic write element, and the second node of the STO is a main pole of the magnetic write element. In some embodiments, the shunt circuit is coupled to a first read line of a read element through a third resistance and to a second read line of the read element through a fourth resistance, and the third and fourth resistances are coupled by a fifth resistance connected in parallel to the first and second read line of the read element. The third and fourth resistances may be approximately 15 kOhms, and the fifth resistance may be approximately 2 kOhms. In some embodiments, the shunt circuit is coupled to a first line of an embedded contact sensor through a third resistance and to a second line of the embedded contact sensor through a fourth resistance. The third and fourth resistances may be approximately 18 kOhms.

In some embodiments, an apparatus for electrically biasing a STO comprises means for determining, using a first analog circuit, a resistance of the STO based on a STO bias voltage and a measured STO bias current; means for determining a STO bias kick current value based on (a) the resistance of the STO, (b) a termination resistance, and (c) either the STO bias voltage or a STO voltage kick value; means for generating the bias current based at least in part on the STO bias current kick value; and means for providing the bias current to the STO. In some embodiments, the apparatus further comprises means for programming a timing of the current kick.

BRIEF DESCRIPTION OF THE DRAWINGS

The disclosure herein is illustrated by way of example, and not by way of limitation, in the figures of the accompanying drawings, in which like reference numerals refer to similar elements and in which.

DETAILED DESCRIPTION

Figure 1:
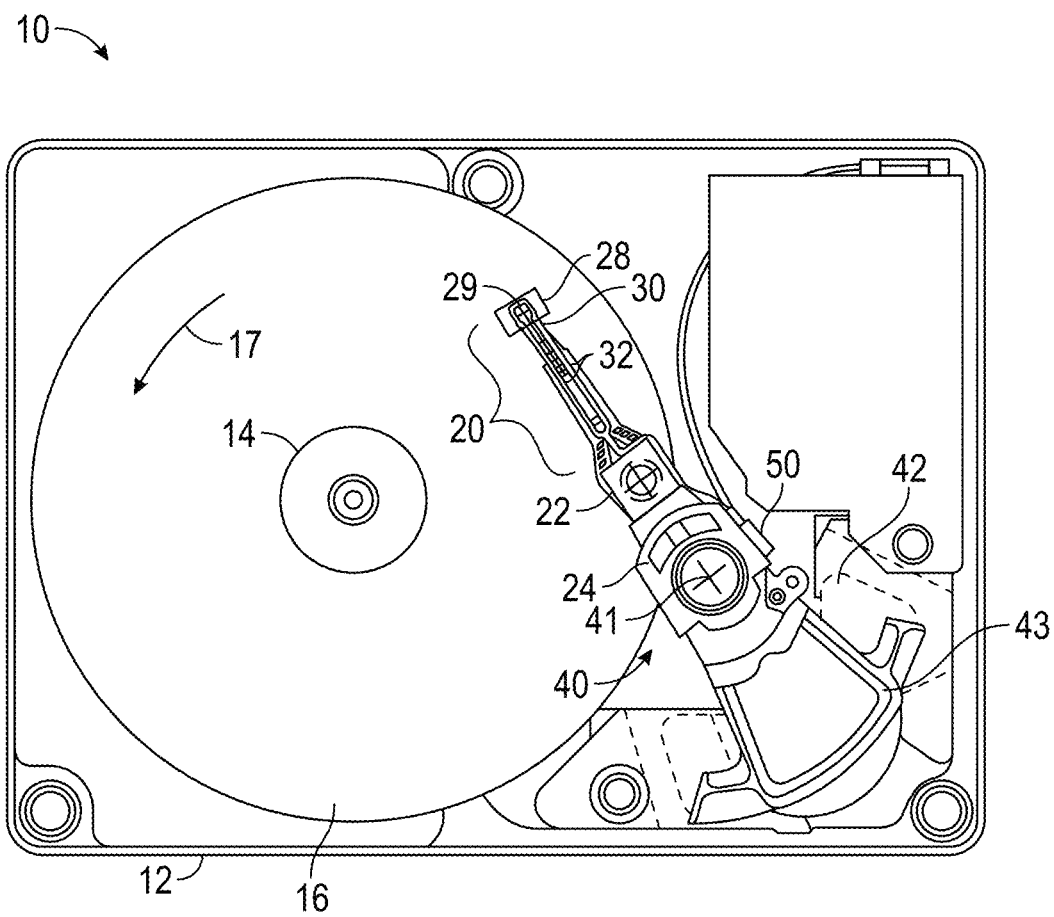
FIG. 1 illustrates several components of an exemplary hard disk drive in accordance with some embodiments.

The following description is made for the purpose of illustrating the general principles of the present disclosure and is not meant to limit the inventive concepts claimed herein. Furthermore, particular embodiments described herein may be used in combination with other described embodiments in various possible combinations and permutations.

The "Background" section above described a "classical" STO. U.S. patent application Ser. No. 15/140,761, filed Apr. 28, 2016 and hereby incorporated by reference, discloses writers with spin-torque-assisted write field enhancement that use a DC-field-generation (DFG) layer to create an auxiliary magnetic field that adds constructively to the write field and thereby enables high-density magnetic recording. A significant benefit of writers that use a DFG layer is that they enable high-density magnetic recording without requiring resonance with the media. Consequently, there is no need to jointly optimize the writer and the media of the disk drive as there would be to achieve high performance with a MAMR writer.

As with the "classical" STO, generating the auxiliary field using the DFG layer approach of application Ser. No. 15/140,761 requires the application of a bias voltage that affects the write transducer's pole potential. In addition, an overshoot may be desirable to improve the performance of a write head using a STO or DFG layer, but providing such an overshoot requires high-speed circuits with a high-bandwidth electrical interconnect, which can adversely affect the reliability of the STO if not set properly from the write signal's crosstalk to the STO. As discussed in the "Background" section, several undesirable effects can be mitigated or eliminated by controlling the slider's voltage potential with respect to the disk's potential. Therefore, there is an ongoing need for methods and apparatuses that control the slider's voltage potential with respect to the disk's potential while supplying a bias current with overshoots to a STO or DFG layer apparatus in the write gap.

Disclosed herein are circuits, architectures, and methods that provide for the control of the write head's trailing shield and main pole potential with respect to the disk using circuitry that is integrated with circuitry used to bias a STO or DFG apparatus. A unique slider architecture and circuit enable control of the potential of the write head's main pole and trailing shield with respect to the disk, with optional electrical connection to nearby transducers and slider. Various embodiments include slider connections with STO/DFG apparatus bias circuitry that resides in a read/write integrated circuit, which has a programmable circuit, referred to herein as a bias kick circuit, that generates a bias current with overshoot (bias kicks) and that allows short bias steps during write transitions. Also disclosed are circuits that may be incorporated into a slider to mitigate radio-frequency interference.

Although a magnetic write head using a DFG layer as described in U.S. application Ser. No. 15/140,761, discussed above, differs from a magnetic write head using a "classical" STO, discussed in the "Background" section herein, for convenience this document refers to both approaches as "STO." It is to be understood that the disclosures herein apply not only to embodiments using "classical" STO but also to embodiments using the DFG layer approach described in application Ser. No. 15/140,761.

FIG. 1 is a top plan view of a head/disk assembly of a hard disk drive 10 with the cover removed. The disk drive 10 includes a rigid base 12 supporting a spindle 14 that supports at least one disk 16. The spindle 14 is rotated by a spindle motor (not shown), which, in operation, rotates the at least one disk 16 in the direction shown by the curved arrow 17. The hard disk drive 10 has at least one load beam assembly 20 having an integrated lead suspension (ILS) or flexure 30 with an array 32 of electrically conductive interconnect traces or lines. The at least one load beam assembly 20 is attached to rigid arms 22 connected to an E-shaped support structure, sometimes called an E-block 24. The flexure 30 is attached to an air-bearing (or, in the case that helium or another gas is used instead of air inside the disk drive, a gas-bearing) slider 28. A magnetic recording read/write head 29 is located at the end or trailing surface of slider 28. The flexure 30 enables the slider 28 to "pitch" and "roll" on an air (or gas) bearing generated by the rotating disk 16.

The disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to the base 12 and a voice coil 43. When energized by control circuitry (not shown), the voice coil 43 moves and thereby rotates E-block 24 with attached arms 22 and the at least one load beam assembly 20 to position the read/write head 29 over the data tracks on the disk 16. The trace interconnect array 32 connects at one end to the read/write head 29 and at its other end to read/write circuitry contained in an electrical module or chip 50, which, in the exemplary disk drive 10 of FIG. 1, is secured to a side of the E-block 24. The chip 50 includes a read/write integrated circuit (R/W IC), certain functions of which are discussed below in the context of certain embodiments.

As the disk 16 rotates, the disk 16 drags air under the slider 28 and along the air-bearing surface (ABS) of the slider 28 in a direction approximately parallel to the tangential velocity of the disk 16. As the air passes under the ABS, air compression along the air flow path causes the air pressure between the disk 16 and the ABS to increase, which creates a hydrodynamic lifting force that counteracts the tendency of the at least one load beam assembly 20 to push the slider 28 toward the disk 16. The slider 28 thus flies above the disk 16 but in close proximity to the surface of the disk 16.

In operation, after the voice coil 43 has positioned the read/write head 29 over the data tracks on the disk 16, the read/write head 29 may be used to write information to one or more tracks on the surface of the disk 16 and to read previously-recorded information from the tracks on the surface of the disk 16. Processing circuitry in the hard drive 10 provides to the read/write head 29 signals representing information to be written to the disk 16 and receives from the read/write head 29 signals representing information read from the disk 16.

To read information from the disk 16, the read/write head 29 may include only one read sensor, or it may include multiple read sensors. The read sensor(s) in the read/write head 29 may include, for example, one or more giant magnetoresistance (GMR) sensors, tunneling magnetoresistance (TMR) sensors, or another type of magnetoresistive sensor. When the slider 28 passes over a track on the disk 16, the read/write head 29 detects changes in resistance due to magnetic field variations recorded on the disk 16, which represent the recorded bits.

Figure 2:
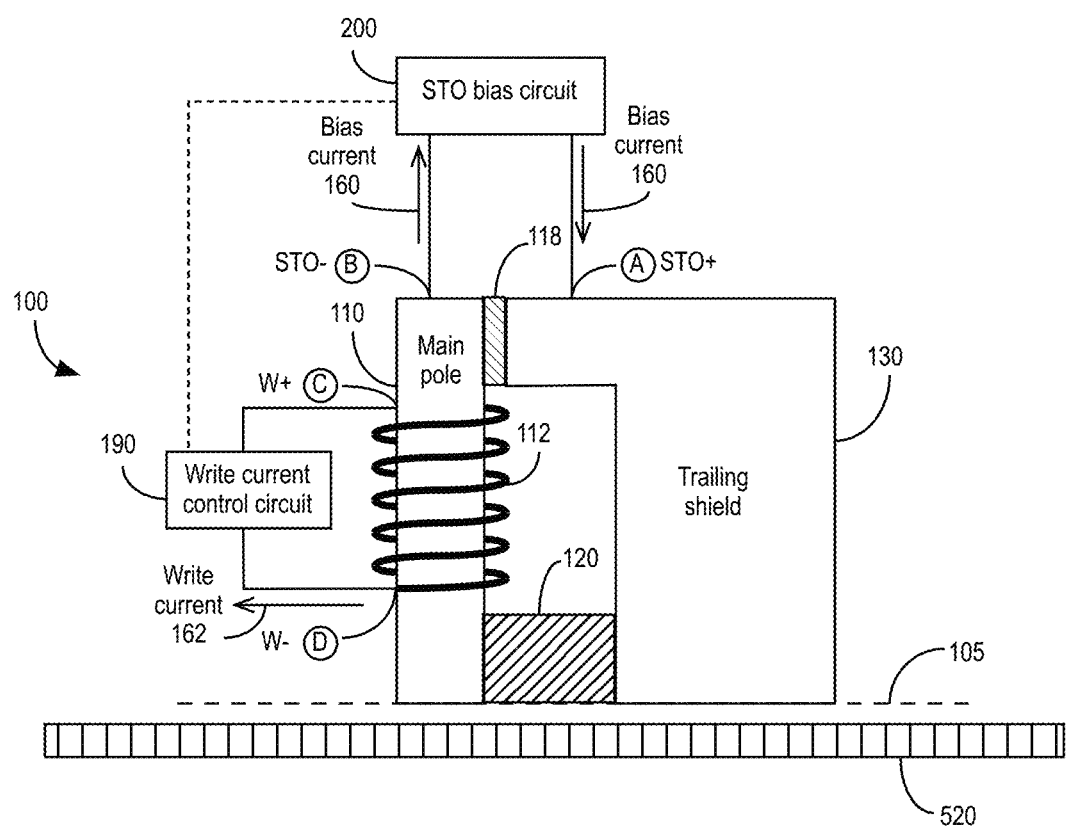
FIG. 2 is a simplified drawing of an apparatus 100 for writing to a magnetic medium in accordance with some embodiments.

FIG. 2 is a simplified drawing of an apparatus 100 for writing to a magnetic medium, such as the disk 16, in accordance with some embodiments. The apparatus 100 includes a STO 120 disposed in the write gap between a main pole 110 and a trailing shield 130 of a write head. As explained previously, the STO 120 may be a conventional STO (i.e., including a STL and a FGL), or it may be in a configuration that uses a DFG layer as described in U.S. application Ser. No. 15/140,761. Two nodes or contacts for supplying the STO bias current to the STO 120 are shown. A first node, labeled "A," is connected to the trailing shield 130, and a second node, labeled "B," is connected to the main pole 110. The apparatus 100 also includes a write coil 112 wound around a magnetic circuit that includes the main pole 110 and the trailing shield 130. The apparatus 100 also includes a STO bias circuit 200, which supplies the bias current 160 to the STO 120 through the nodes A and B, and a write current control circuit 190, which supplies the write current 162 to the write coil 112 through the nodes labeled "C" and "D." As indicated by the dashed line, the STO bias circuit 200 and the write current control circuit 190 may be communicatively coupled (i.e., the STO bias circuit 200 may be able to receive signals or information from the write current control circuit 190).

The main pole 110 is typically made from a high-saturation magnetization material for generating a write field that is substantially perpendicular to the surface of the magnetic disk over which the slider 28 flies. Away from the ABS 105, the main pole 110 and trailing shield 130 are coupled by a nonconductive material 118 (e.g., aluminum oxide or another nonconductive material) that also electrically insulates the main pole 110 from the trailing shield 130.

The write coil 112 is connected to the write current control circuit 190, which may be implemented in a R/W IC. In order to write to the magnetic medium, the write current control circuit 190 supplies a write current to the write coil 112. The write coil 112 magnetizes the main pole 110 and causes the main pole 110 to generate a write field that is substantially perpendicular to the ABS 105, which then interacts with the magnetic medium 520 to record information onto the magnetic medium 520. The polarity of the generated field causes a region of the magnetic disk 16 to assume a polarity, thus enabling information to be stored on the disk 16.

The STO 120, which is disposed in the write gap between the main pole 110 and the trailing shield 130, is coupled to the STO bias circuit 200 through the main pole 110 and the trailing shield 130 at, respectively, nodes B and A. The driving current control circuit 200 may be implemented in a R/W IC as discussed below in the context of FIG. 7. As explained previously, when an appropriate bias current 160 is supplied to the STO 120, the STO 120 generates an auxiliary magnetic field in the disk 16 that adds constructively to the magnetic field generated by the main pole 110 and thereby improves the performance of the writer.

As will be understood by a person having ordinary skill in the art, the trailing shield 130 is a significant physical part of the write element structure that is exposed to the ABS 105. Thus, typically, the STO bias circuit 200 applies a positive voltage to the trailing shield 130, node A, as compared to the main pole 110, node B. It is to be understood that in some embodiments, a programmable bit may be used to reverse the STO bias polarity. All of the design principles disclosed herein remain applicable to such embodiments.

At least some embodiments described herein allow existing signal paths on the slider 28 to be employed to perform their existing functions, such as supplying the STO bias current 160 to the STO 120 or an embedded contact sensor signal to an embedded contact sensor, while also being used in an integral fashion to couple a bias voltage to the body of the slider 28, and, in some embodiments, to control or attenuate RFI signals. As sliders have become very small, there is often little or no physical space on the slider 28 to add additional signal paths. At least some of the embodiments described herein provide for slider 28 biasing and RFI interference immunity or attenuation by using existing signal paths.

Figure 7:
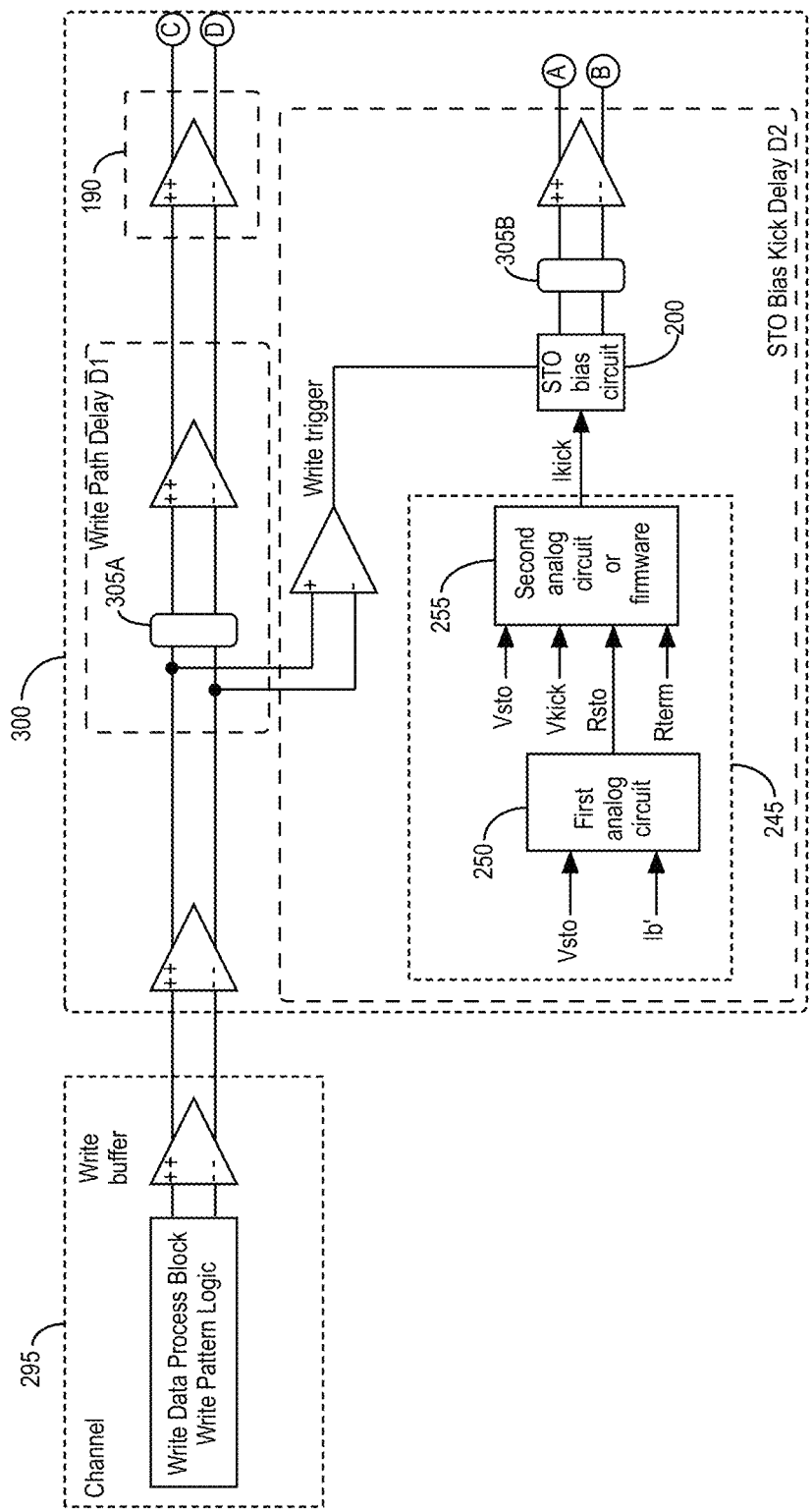
FIG. 7 illustrates an architecture in which timing for the bias kick is determined based on the input write data transitions and a programmable delay.

The disclosed architecture is referred to herein as an integrated STO-bias kick (ISBK) architecture. In some embodiments, the ISBK architecture has slider shunt connections that connect to the existing STO bias lines and control the slider potential. In some embodiments, the slider 28 includes a high-frequency low-impedance path to provide RFI immunity. In some embodiments, the slider 28 has transducer connections to a common electrical connection that connects to the STO bias line(s) to electrically bias the STO. In some embodiments (e.g., as shown in FIG. 7), the hard disk drive includes a R/W IC that includes a STO bias circuit 200 to provide high-speed bias kicks (overshoot) to improve STO 120 reliability, including, in some embodiments one or more of the following: (i) an electrical circuit to produce STO bias kicks; (ii) a STO bias kick signal trigger from a write data signal input; (iii) a programmable timing delay offset from a write signal input and STO bias kick transition; (iv) differential STO bias kick crosstalk mitigation; and/or (v) a high-bandwidth interconnect for delivering bias kicks to the STO 120. As explained below, the disclosed architectures provide for either current biasing or voltage biasing. In some embodiments, the R/W IC's STO bias circuit 200 provides the bias for the write trailing shield 130 and main pole 110 and other transducers. In some embodiments, the bias potential is controllable with respect to the media and is limited in value so as to prevent head-to-disk breakdown damage (<1 Volt), and/or current-limit protection is provided for conductive asperities to the disk.

As used herein, the phrase "existing signal path" refers to using an existing signal path, such as a STO bias current 160 path or an embedded contact sensor path, to couple the bias voltage to slider 28 body. As explained below, the existing signal path may be slightly modified, such as through the inclusion of components such as a capacitance, a coupling to a slider 28 body connection, and/or a resistance, but there is no need for a separate special purpose signal path for coupling the slider bias voltage from slider bias voltage generator to the slider body. As used herein, the term "integrated" means that the existing signal path is primarily used for conveying another signal (e.g., a STO bias current 160 or embedded contact sensor signal) between the slider 28 and some entity external to the slider 28. At least sometimes, however, the other signal and a slider bias voltage are conveyed simultaneously, integrated together with one another, on the same signal path within the slider 28. Thus, this existing signal path may convey the bias voltage to the slider 28 body along with the other signal (e.g., STO bias current 160 or embedded contact sensor signal) that is being conveyed on the same signal path.

Figure 3A:
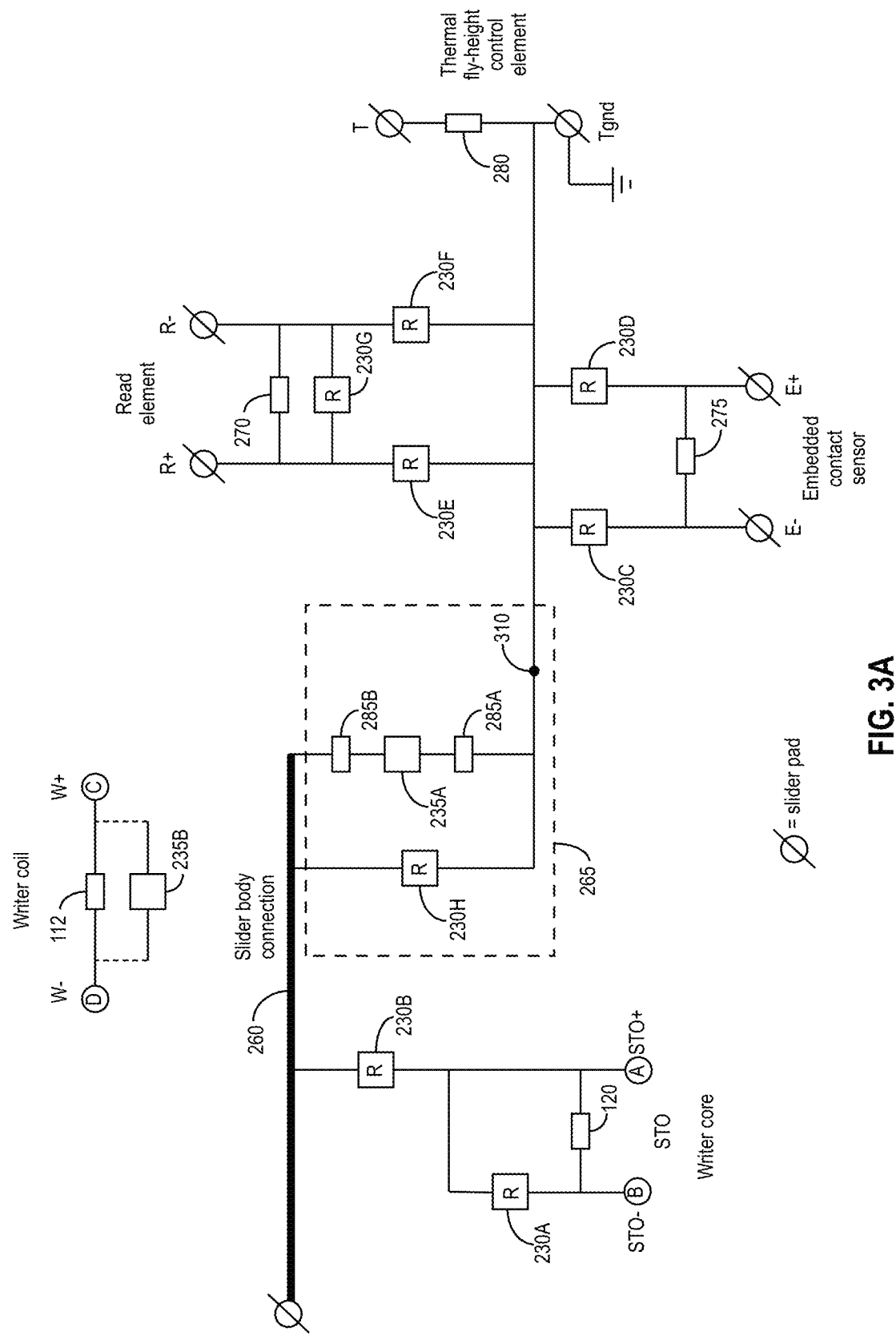
FIG. 3A illustrates an electrical shunt configuration that may be implemented in the slider to control the potential of the slider body with respect to ground and the disk potential in accordance with some embodiments.

FIG. 3A illustrates a configuration that is implemented in the slider 28 to control the potential of the slider 28 body with respect to ground and the disk 16 in accordance with some embodiments. The slider 28 has conductive connections and includes a write coil 112, a read element 270, a STO 120, an embedded contact sensor 275, and a thermal fly-height control element 280. As shown, each of the elements is associated with slider pads configured to connect to signal lines from an external integrated circuit (IC). Thus, each of the write coil 112, read element 270, and embedded contact sensor 275 includes input/output pads denoted, respectively, as W+ and W−, R+ and R−, and E+ and E−. The thermal fly-height control element 280 has input/output pads denoted as T and Tgnd, where Tgnd is connected to ground in this exemplary embodiment.

The thick line represents the slider body connection 260. As shown in FIG. 3A, the write coil 112 is floating. Optionally, a capacitance 235B may be connected in parallel between the write lines W+ and W− through nodes C and D. If present, the capacitance 235B has a value of approximately 3 pF.

FIG. 3A includes a shunt circuit 265 disposed between the slider body connection 260 and ground (node 310). The shunt circuit 265 comprises a resistance 230H connected in parallel with a capacitance 235A in series with two parasitic resistances 285A and 285B. The capacitance 235A shunts RFI signals from the slider 28 body through the capacitance 235A to ground through node 310, thus reducing or eliminating the RFI signals and, at the same time, reducing or attenuating the coupling of RFI signals to the read element 270. The shunt circuit 265 thereby provides RFI suppression of high-frequency signals that have coupled into the slider 28 body. As will be understood by skilled artisans, the values of the capacitance 235A and the resistance 230H may be selected to achieve an appropriate cutoff frequency, fc, for shunting RFI signals using the equation C=1/(2*pi*R*fc). In some embodiments, the resistance 230H is approximately 750 kOhms, the capacitance 235A is greater than or equal to 40 pF, and the sum of the parasitic resistances 285A and 285B is less than about 10 Ohms. The shunt circuit 265 creates a path to ground (node 310) for AC signals (e.g., signals having frequencies above a selected cutoff frequency) that might otherwise degrade the performance of the hard disk drive 10. For example, when the shunt circuit 265 is included in the slider 28, RFI signals that might otherwise travel to the read element 270, thereby potentially adding interference signals to the read signals and creating possible read errors, are shunted to ground (node 310).

To control the resistance of the read element 270, a resistance 230G is connected in parallel with the read element 270 between the read lines R+ and R−. For preventing electrical charge build up during processing, a resistance 230E is connected between the node 310 and the read line R+, and a resistance 230F is connected between the node 310 and the read line R−. Preferably, the resistances 230E and 230F have values of approximately 15 kOhms, and the resistance 230G has a value of approximately 2 kOhms. Similarly, for preventing electrical charge buildup, the embedded contact sensor 275 has a resistance 230C connected between the node 310 and the embedded contact sensor line E−, and a resistance 230D connected between the node 310 and the embedded contact sensor line E+. Preferably, the values of the resistances 230C and 230D are approximately 18 kOhms.

In addition to mitigating RFI interference, the configuration of FIG. 3A also provides an asymmetric circuit that allows integrated, single-ended control of the trailing shield 130 potential through the node A. As explained above, the STO 120 is connected to the main pole 110 and the trailing shield 130 through, respectively, the nodes B and A. A resistance 230A is connected in parallel between the nodes A and B, and a resistance 230B is connected between the node A and the slider body connection 260. Preferably, the values of the resistances 230A and 230B are approximately 18 kOhms. As explained elsewhere, the nodes A and B are connected to a STO bias circuit 200, described below in more detail. Thus, although the primary purpose of the nodes A and B is to provide the STO bias current 160 to the STO 120, in some embodiments, the nodes A and B are also used to couple the slider bias voltage to the slider 28 body. When writing occurs (e.g., when the hard disk drive is in a write mode), the STO bias current 160 and slider bias voltage can be conveyed simultaneously through the nodes A and B. When no writing is taking place (e.g., when the hard disk drive is in a mode that does not include writing), the nodes A and B may be used solely to bias the slider 28.

Figure 3B:
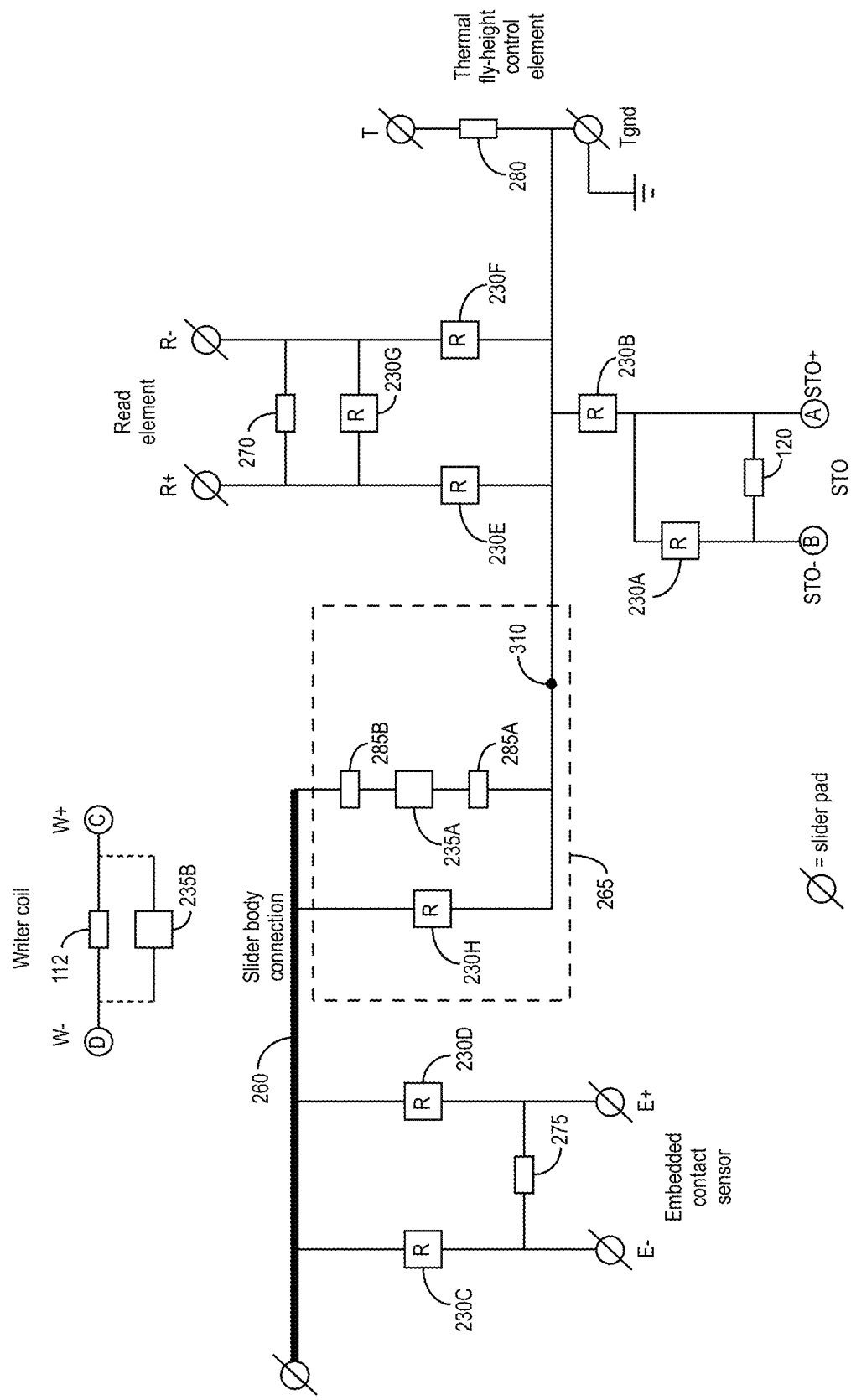
FIG. 3B illustrates an alternative slider shunt configuration in accordance with some embodiments.

FIG. 3B illustrates an alternative electrical shunt configuration that is implemented in the slider 28 to control the potential of the slider 28 body with respect to ground and the disk 16 potential in accordance with some embodiments. As in FIG. 3A, the write coil 112 is floating. Optionally, a capacitance 235B may be connected in parallel between the write lines W+ and W− through nodes C and D. If present, the capacitance 235B has a value of approximately 3 pF.

Like FIG. 3A, FIG. 3B includes a shunt circuit 265 disposed between the slider body connection 260 and ground (connected to node 310). The shunt circuit 265 of FIG. 3B is identical to the shunt circuit 265 of FIG. 3A and provides the same benefits.

Also as in FIG. 3A, a resistance 230E is connected between the node 310 and the read line R+, a resistance 230F is connected between the node 310 and the read line R−, and a resistance 230G connected in parallel with the read element 270 between the read lines R+ and R−. Preferably, the resistances 230E and 230F have values of approximately 15 kOhms, and the resistance 230G has a value of approximately 2 kOhms.

As explained previously, the STO 120 is connected to the main pole 110 and the trailing shield 130 through, respectively, the nodes B and A. In the configuration of FIG. 3B, a resistance 230A is connected in parallel between the nodes A and B, and a resistance 230B is connected between the node A and the node 310. Preferably, the values of the resistances 230A and 230B are approximately 18 kOhms.

In the embodiment of FIG. 3B, the common mode of the embedded contact sensor 275 is used to control the potential of the slider 28, and the trailing shield 130 is kept at ground potential. A resistance 230C connected between the slider body connection 260 and the embedded contact sensor line E− and a resistance 230D connected between the slider body connection 260 and the embedded contact sensor line E+. Preferably, the values of the resistances 230C and 230D are approximately 18 kOhms. Thus, although the primary purpose of the lines E+ and E− is to provide signals to the embedded contact sensor, in some embodiments, the lines E+ and E− are also used to couple the slider bias voltage to the slider body.

Figure 4:
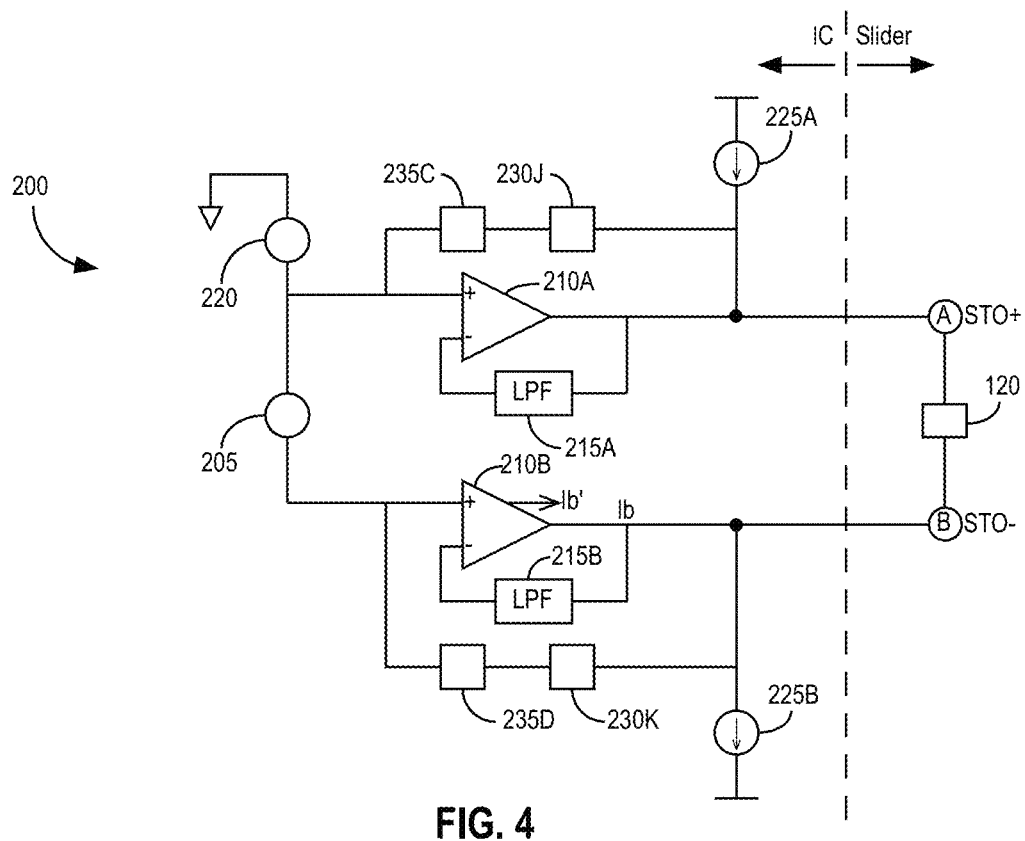
FIG. 4 illustrates a circuit for biasing both the slider potential and the potential of the resistive STO element.

FIG. 4 illustrates a STO bias circuit 200 for biasing both the slider 28 potential, at node A, and the potential of the STO 120, which is the differential potential between node A and node B, in accordance with some embodiments. For example, the STO bias circuit 200 shown in FIG. 4 may be used in conjunction with the exemplary configuration illustrated in FIG. 3A to bias the slider 28 body and provide the STO bias current 160 through the nodes A and B. The STO bias circuit 200 uses feedback to set the DC level (e.g., the amplitude of a low-frequency or DC component) of the STO bias current 160 supplied to the STO 120. In some embodiments, the STO bias circuit 200 resides in a R/W IC (e.g., as shown in FIG. 7). The STO bias circuit 200 includes a first operational transconductance amplifier (OTA) 210A and a second OTA 210B. As would be appreciated by a person having ordinary skill in the art, an OTA is an amplifier that converts a differential input voltage to an output current. An OTA typically has a high input impedance and a high gain, though a high gain is not a requirement (i.e., the gain may be a lower level). The first OTA 210A has two inputs, shown as "+" and "−" in FIG. 4, and one output. A low-pass filter (LPF) 215A is coupled to the "−" input of the first OTA 210A and to the output of the first OTA 210A. Similarly, the second OTA 210B has two inputs, shown as "+" and "−" in FIG. 4, and one output. A LPF 215B is coupled to the "−" input of the second OTA 210B and to the output of the second OTA 210B. Preferably, the cutoff frequencies of the LPFs 215A and 215B are tens of MHz. The "+" inputs of both the first OTA 210A and the second OTA 210B are coupled to a STO bias voltage source 205. The "+" input of the first OTA 210A and the STO bias voltage source 205 are also coupled to an interface voltage control (IVC) circuit 220. The IVC circuit 220 provides the slider bias voltage, and the STO bias voltage source 205 provides the DC level (e.g., the amplitude of the low-frequency (e.g., DC) component) of the STO bias current 160. A first capacitance 235C and a first resistance 230J (e.g., with a value equal to half of the termination resistance, Rterm) are connected in series between the "+" input of the first OTA 210A and node A. A second capacitance 235D and a second resistance 230K are connected in series between the "+" input of the second OTA 210A and node B. A differential current source, represented by the current sources 225A and 225B, is also coupled to nodes A and B to provide the STO bias kick to the STO 120. Thus, the STO bias circuit 200 of FIG. 4 enables the simultaneous control of the slider 28 potential and supply of the STO bias current 160 with bias kicks through the nodes A and B.

In some embodiments, such as the embodiment illustrated in FIG. 3A, node A is connected to the slider 28 body through a resistance 230B, and the first OTA 210A is used as a voltage follower with the IVC circuit 220 potential. By using the LPF 215A in the feedback loop of the first OTA 210A, the output impedance is relatively high as compared to the termination resistances 230J and 230K in the high-frequency region (e.g., >100 MHz). At high frequencies, the LPFs 215A and 215B block signals and act as an open circuit. This high-frequency condition then allows for good transmission line termination for the high-bandwidth interconnect while providing current kicks to the STO 120. Similarly, the voltage of the STO bias voltage source 205 is imposed on the resistance of the STO 120 by the second OTA 210B and LPF 215B. The voltage bias kick (overshoot) can then be applied by the differential current sources 225A and 225B. The use of a differential kick is preferred to reduce the crosstalk of adjacent signal paths on the ILS or flexure 30.

With all of the components shown in FIG. 4 enabled, the STO bias circuit 200 uses voltages and the differential current sources 225A and 225B to bias the STO 120. The STO bias circuit 200 may also be used to implement an all-current STO bias. In such embodiments, the kick current sources 225A and 225B provide a low-frequency component (which may be either purely DC or may include a low-frequency AC component) in addition to the kick current, where the low-frequency component is added to the kick current. In such embodiments, the first OTA 210A and the LPF 215A are enabled, and the OTA 210B and LPF 215B are disabled or are eliminated altogether from the STO bias circuit 200 of FIG. 4. Such embodiments allow for an all-current bias scheme for the STO 120.

When the bias current 160 comprises a low-frequency (e.g., DC) component and a kick current, the low-frequency component may be programmable (e.g., the voltage provided by the STO bias voltage source 205 may be based on a programmed value of the low-frequency component and a resistance of the STO 120).

Figure 5:
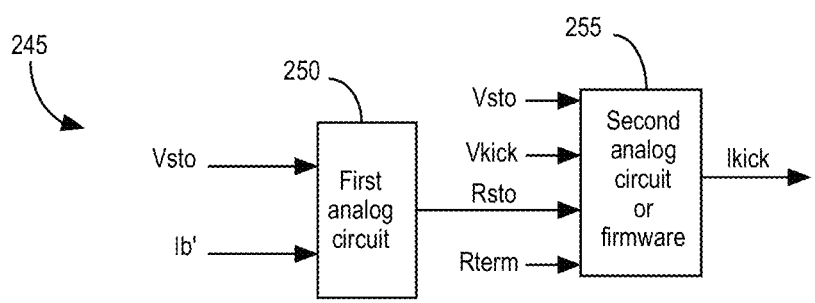
FIG. 5 illustrates the determination of the appropriate STO bias kick current value in accordance with some embodiments.

To improve the reliability of the STO 120, a voltage bias kick may be preferred over a current kick. FIG. 5 is a block diagram of a STO bias kick calculation circuit 245 that determines the appropriate STO bias kick current value, denoted as Ikick, in accordance with some embodiments. Using a first analog circuit 250 (also referred to herein as an intrinsic circuit), the resistance of the STO 120, denoted as Rsto, is calculated using the values of a measured STO bias current 160, denoted as Ib', and the voltage, Vsto, provided by the STO bias voltage source 205. The Rsto value, with the termination resistance value (Rterm), and the Vkick value or percentage of Vsto are then processed by the block 255 to calculate the Ikick value. As indicated by FIG. 5, the block 255 may be a second analog circuit (a second intrinsic circuit) or firmware functionality executed by a processor (referred to herein simply as "firmware"). The Ikick bias may then be supplied to the nodes A and B using a push-pull differential circuit that creates bias pulses (e.g., the circuit 200 shown in FIG. 4).

Figure 6:
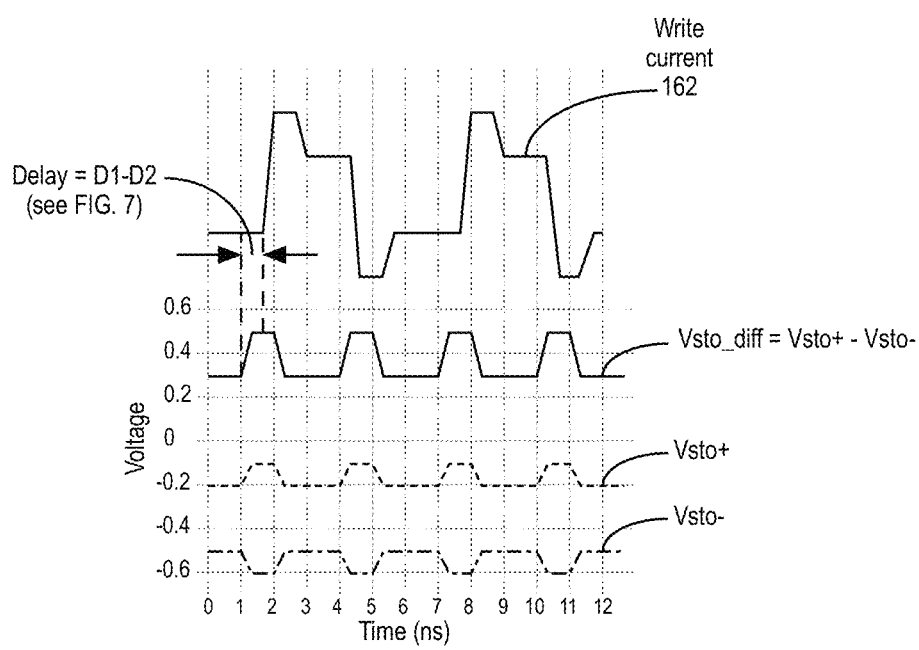
FIG. 6 shows an exemplary write current and exemplary voltage kicks in accordance with some embodiments.

FIG. 6 illustrates an exemplary write current 162 along with an example of the voltage kicks. The DC level of the differential Vsto bias (labeled as Vsto_diff in FIG. 6) is 300 mV and the Vkick value is 200 mV. The values shown in FIG. 6 are typical offset values for the IVC voltage, Vsto+=−200 mV, and the low potential of the main pole 110, Vsto−=−500 mV. As illustrated, the voltage kicks are offset from the pulses of the write current 162 by a delay that is equal to D1−D2, where D1 is the delay of the write path and D2 is the delay of the STO bias kick, both of which are discussed below in the context of FIG. 7. In some embodiments, the offset between the STO kicks and the pulses of the write current 162 is programmable.

FIG. 7 shows a high-level architecture that illustrates the embodiments of FIGS. 4 and 5 in the context of the channel 295, part of the system on a chip (SoC), and the R/W IC 300. As illustrated, in some embodiments, the STO bias circuit 200 and the STO bias kick calculation circuit 245 are incorporated into the R/W IC 300. The output of the STO bias kick calculation circuit 245 is the kick current, Ikick, and the STO bias circuit 200 generates the STO bias current 160 as described previously in the context of FIGS. 4-6. The STO bias current 160 includes Ikick and may be provided by the STO bias voltage source 205 and the IVC circuit 220 in conjunction with the embodiment illustrated in FIG. 3A. The output of the STO bias circuit 200 is then delayed by a programmable delay block 305B. The STO bias kick path has an inherent circuit delay denoted as D2, a part of which is the delay caused by the programmable delay block 305B. Delay blocks 305A and 305B may be configured to provide a substantial amount of offset time, such that adequate time is allowed for presetting the high-speed circuits that create the current kick amplitude and shape, for example, the rise/fall time. Shown in FIG. 6 is the STO differential bias kick, where the kick precedes the write current transition, but it is to be appreciated that the kick may follow or coincide with the write current transition. The architectures and methods disclosed herein provide significant flexibility in the timing (e.g., relative to a write pulse of the write current 162) and characteristics (e.g., amplitude, duration, shape, etc.) of the bias kicks. The examples discussed and illustrated herein are not intended to be limiting.

The channel 295 includes a write data process block and write pattern logic coupled to a write buffer. The output of the channel 295 enters the R/W IC 300, which includes a write path. The write path has an inherent circuit delay denoted as D1, a part of which is the delay of the programmable delay block 305A.

In the exemplary embodiment of FIG. 7, the timing for the bias kick current Ikick is determined based on a write trigger, on either or both of the positive and negative write transitions, and the delays of the programmable delay blocks 305A and 305B. Preferably, the delays D1 and D2 are designed to be independent of temperature, such that environmental changes will not affect the pre-programmed delay offsets. The characteristics (e.g., amplitude, duration, transitions, frequency, duty cycle, etc.) of the write current 162 and the bias current 160 may be jointly optimized to achieve the desired performance.

Figure 8:
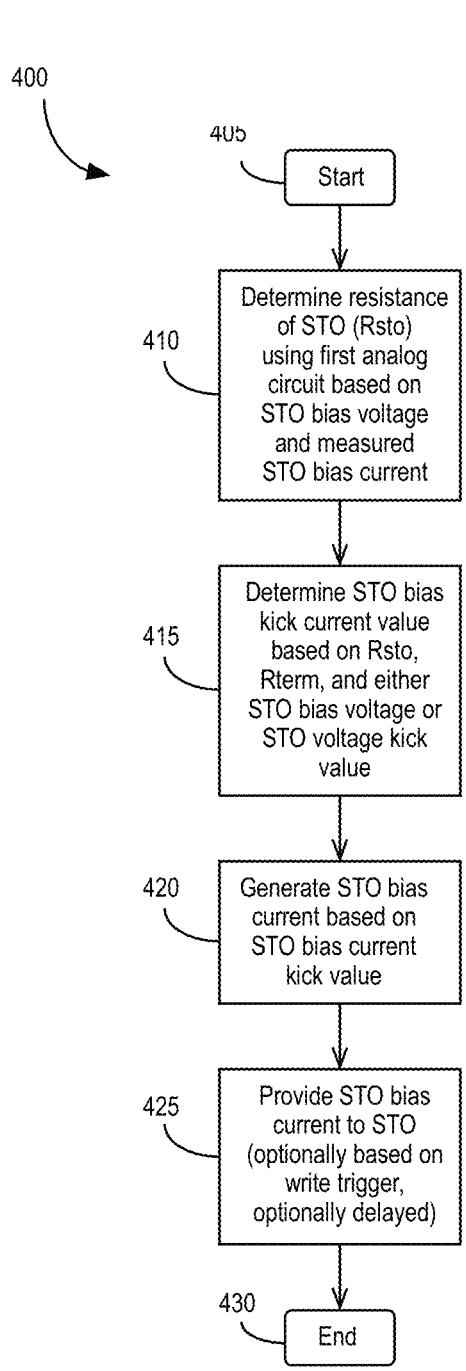
FIG. 8 is a flowchart illustrating a method of electrically biasing a STO in accordance with some embodiments.

FIG. 8 is a flowchart illustrating a method 400 of electrically biasing a STO 120 in accordance with some embodiments (e.g., as shown in FIGS. 4 and 5). At 405, the process begins. At 410, the resistance Rsto of the STO 120 is determined by the first analog circuit 250 based on the STO bias voltage Vsto (provided by STO bias voltage source 205) and a measured STO bias current 160, where the baseline STO bias (also referred to herein as the DC or low-frequency component) may be determined by the resistance value or firmware. At 415, a second analog circuit or firmware 255 determines a STO bias kick current value (e.g., indicating an amplitude of an AC component of the STO bias current 160) based on Rsto, a termination resistance, and either the STO bias voltage Vsto or a STO voltage kick value. At 420, the STO bias current 160 is generated based at least in part on the STO bias current kick value. At 425, the STO bias current 160 is provided to the STO 120. In some embodiments, the STO bias current 160 is provided to the STO 120 by a push-pull differential circuit (e.g., as described the context of FIG. 4). In some embodiments, the STO bias current 160 is provided to the STO 120 dependent on a write trigger (e.g., as shown in FIG. 7). The timing of the STO bias current 160 may be determined based on a positive write signal transition and/or a negative write signal transition (e.g., the write current 162 shown in FIG. 6). The timing of the STO bias current 120 may be programmable so that the STO bias kick occurs at a desired time. In some embodiments, the STO bias current 160 is delayed before it is provided to the STO 120 to adjust the timing of the STO bias kick (i.e., the AC or high-frequency component of the STO bias current 160) with respect to the write data signal timing (e.g., as shown in FIG. 7). At explained above, the characteristics of the STO bias current 160 and the write current 162, including timing, may be jointly optimized. At 430, the method ends.

Figure 9:
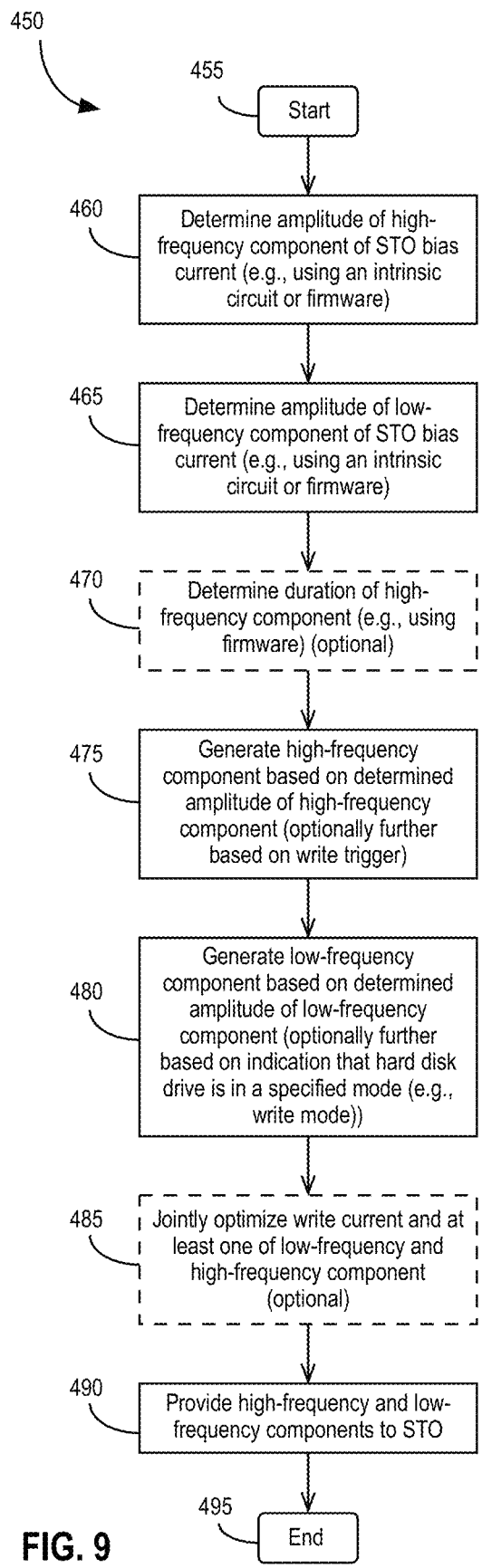
FIG. 9 is a flowchart illustrating a method of electrically biasing a STO in accordance with some embodiments.

FIG. 9 is a flowchart illustrating another method 450 of electrically biasing a STO 120 in accordance with some embodiments. At 455, the process begins. At 460, the amplitude of a high-frequency component of the STO bias current 160 is determined. The high-frequency component includes Ikick. The amplitude of the high-frequency component may be determined using an intrinsic circuit or firmware (e.g., as illustrated in the embodiment of FIG. 5). At 465, the amplitude of a low-frequency component of the STO bias current 160 is determined. The low-frequency component may be simply a DC component, or it may include a low-frequency AC component (where "low-frequency" means that the frequency of any AC component included in the low-frequency component is lower than the frequency of the high-frequency component). The amplitude of the low-frequency component may be determined using an intrinsic circuit (e.g., as illustrated in FIG. 4) or firmware. At 470, the duration of the high-frequency component is optionally determined. The duration of the high-frequency component may be expressed relative to a period of the high-frequency component (e.g., as a duty cycle) or in units of time (e.g., picoseconds). If performed, block 470 may be performed using firmware.

At 475, the high-frequency component of the STO bias current is generated (e.g., using the circuit shown in FIG. 4) based at least in part on the amplitude of the high-frequency component determined at block 460. Optionally, if optional block 470 was performed, the high-frequency component is further generated based on the duration determined at block 470. The high-frequency component may optionally be generated based at least in part on a write trigger (as shown, for example, in FIG. 7), which may be, for example, determined based on at least one write signal transition. At 480, the low-frequency component of the STO bias current 160 is generated based at least in part on the amplitude of the low-frequency component determined at block 465 (e.g., using the circuit shown in FIG. 4). Optionally, the low-frequency component may be generated further based on an indication that the hard disk drive is in a specified mode. For example, the low-frequency component may be generated when the hard disk drive is in a write mode. Alternatively, or in addition, the low-frequency component may be generated when the hard disk drive is in a mode that includes at least one operation other than writing (e.g., reading). Optionally, at 485, the write current and either or both of the low-frequency component and the high-frequency component are jointly optimized. At 490, the high-frequency and low-frequency components are provided to the STO 120. As explained in the discussion of FIG. 4, the low-frequency component may be generated using a current source or a voltage source. The high-frequency component may be generated using a current source. At 495, the method ends.

It is to be understood that some of the blocks shown in FIG. 9 may be performed in a different order than illustrated. For example, block 465 may be performed before, after, or at the same time as block 460. Similarly, if optional block 470 is performed, it may be performed before, after, or at the same time as either or both of blocks 460, 465. Furthermore, although block 475 must follow block 460, block 475 may be performed before, after, or at the same time as blocks 465 and 480. Likewise, although block 480 must follow block 465, block 480 may be performed before, after, or at the same time as blocks 460, 470 (if performed), and 475. Moreover, the optional joint optimization of the write current and the low-frequency and/or high-frequency component(s) of the STO bias current at block 485 may involve other blocks (e.g., block 485 may include portions or all of blocks 460, 465, 470 (if performed), 475, and/or 480). Similarly, block 485 may iterate through or repeat other blocks (e.g., block 485 may loop through some or all of blocks 460, 465, 470 (if performed), 475, and/or 480). Thus, FIG. 9 presents one exemplary ordering of the various blocks, including optional blocks. Alternative orderings are possible and are explicitly contemplated herein.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. An apparatus for electrically biasing a spin-torque oscillator (STO), the apparatus comprising:
   means for determining an amplitude of a high-frequency component of a bias current;
   means for determining an amplitude of a low-frequency component of the bias current;
   means for generating the high-frequency component based at least in part on the determined amplitude of the high-frequency component;
   means for generating the low-frequency component based at least in part on the determined amplitude of the low-frequency component;
   means for providing the high-frequency component to the STO; and
   means for providing the low-frequency component to the STO.

2. The apparatus recited in claim 1, further comprising:
   means for programming a delay or an advance of the high-frequency component before providing the high-frequency component to the STO.

3. The apparatus recited in claim 1, further comprising:
   means for jointly optimizing (a) a write current for writing to a magnetic medium and (b) at least one of the low-frequency component or the high-frequency component.

4. The apparatus recited in claim 1, wherein generating the high-frequency component is further based at least in part on a signal trigger, wherein the signal trigger is determined based on at least one write signal transition.

5. The apparatus recited in claim 1, wherein the means for determining the amplitude of the high-frequency component comprise firmware configured to calculate the amplitude of the high-frequency component based at least in part on a STO resistance value.

6. The apparatus recited in claim 1, wherein the means for determining the amplitude of the high-frequency component comprise a circuit.

7. The apparatus recited in claim 1, further comprising:
   means for determining a duration of the high-frequency component.

8. The apparatus recited in claim 7, wherein the means for determining the duration of the high-frequency component comprise firmware.

9. The apparatus recited in claim 1, wherein generating the low-frequency component is further based at least in part on an indication that the data storage device is in a specified mode.

10. The apparatus recited in claim 9, wherein the specified mode is a write mode.

11. The apparatus recited in claim 9, wherein the specified mode includes at least one operation other than writing.

12. The apparatus recited in claim 1, wherein the means for determining the amplitude of the low-frequency component comprise firmware configured to calculate the amplitude of the low-frequency component based at least in part on a STO resistance value.

13. The apparatus recited in claim 1, wherein the means for determining the amplitude of the low-frequency component comprise a circuit.

14. The apparatus recited in claim 1, further comprising:
   means for jointly optimizing (a) a write current for writing to a magnetic medium and (b) at least one of the low-frequency component or the high-frequency component.

15. The apparatus recited in claim 1, further comprising:
   means for programming at least one characteristic of the high-frequency component before providing the high-frequency component to the STO.

16. The apparatus recited in claim 15, wherein the at least one characteristic comprises a delay, an advance, a timing, the amplitude, or a duration of the high-frequency component.

17. A data storage device comprising the apparatus recited in claim 1.

18. An apparatus for electrically biasing a spin-torque oscillator (STO), the apparatus comprising:
- means for determining, using a first analog circuit, a resistance of the STO based on a STO bias voltage and a measured STO bias current;
- means for determining a STO bias kick current value based on (a) the resistance of the STO, (b) a termination resistance, and (c) either the STO bias voltage or a STO voltage kick value;
- means for generating the bias current based at least in part on the STO bias current kick value; and
- means for providing the bias current to the STO.

19. The apparatus recited in claim 18, further comprising: means for programming a timing of the current kick.

20. A data storage device comprising the apparatus recited in claim 18.

* * * * *